United States Patent

[11] 3,555,306

[72] Inventors George R. Cogar
Frankfort;
Torkjell Sekse, Marcy; Walter Banziger;
Joseph W. Ming, Utica; Laszlo Horvath,
Ilion, N.Y.

[21] Appl. No. 792,901
[22] Filed Jan. 14, 1969
Division of Ser. No. 541,450, Mar. 30, 1966,
Patent No. 3,483,523
[45] Patented Jan. 12, 1971
[73] Assignee Mohawk Data Sciences Corporation
Herkimer, N.Y.
a corporation of New York

[54] KEYBOARD SPROCKET CIRCUIT
7 Claims, 3 Drawing Figs.

[52] U.S. Cl. .......... 307/268,
307/255, 307/265, 307/293; 278/165
[51] Int. Cl. .......... H03k 5/00
[50] Field of Search .......... 307/255,
265, 268, 293; 328/165

[56] References Cited
UNITED STATES PATENTS

| | | | |
|---|---|---|---|
| 2,864,007 | 12/1958 | Clapper | 307/255 |
| 3,132,302 | 5/1964 | Smith | 328/165X |
| 3,302,040 | 1/1967 | Dryden | 307/293X |
| 3,376,431 | 4/1968 | Merrell | 307/265X |

*Primary Examiner*—Donald D. Forrer
*Assistant Examiner*—R. C. Woodbridge
*Attorneys*—Francis J. Thomas, Richard H. Smith, Thomas C. Siekmon and Sughrue, Rothwell, Mion, Zinn and MacPeak

ABSTRACT: A pulse-shaping circuit for converting a signal from an operator controlled keyboard to one which is free of bounce-spikes and suitable for logic circuits in a data recording machine. The circuit contains a pair of integrating networks which reshape the leading and trailing edges of the keyboard output signal. Additionally, if the keyboard output occurs for a predetermined length of time, the circuit provides a continuous series of signals for repetitively recycling the machine as long as the keyboard output signal remains. This is accomplished by a timing circuit, responsive to such a keyboard output, which activates a circuit for transmitting repeated simulated keyboard outputs to the pulse-shaping circuit. The timing and simulation circuits are connected in a feedback delay loop to cause the pulse-shaping circuit to oscillate at a fixed frequency.

PATENTED JAN 12 1971 3,555,306

GEORGE R. COGAR
TORKJELL SEKSE
WALTER BANZIGER
JOSEPH W. MING
LASZLO HORVATH
*INVENTORS.*

BY Richard H. Smith

Attorneys

KEYBOARD SPROCKET CIRCUIT

This is a division of application Ser. No. 541,450, filed on Mar. 30, 1966, now U. S. Pat. No. 3,483,523.

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines—a card punch and a key verifier—have usually been used to record information in computer systems. In the data recorder in which the invention is utilized business and scientific data can be manually recorded and verified on magnetic tape without the need for any intermediate medium.

The data recorder can operate in either an entry mode or a verify mode, and format programming flexibility is provided for each. In addition, a search mode permits location of any specific block of information. The programming system of the data recorder provides all of the automatic features available in card punch machines and performs all functions hundreds of times faster. Duplication of information common to a number of unit records occurs at microseconds per column speed from program or operator control. This speed, like the speed of skipping and automatic verification, contributes greatly to the overall high speed operation of the machine and further enhances the operator's ability to keep key stroke rhythm even and easy.

The correction of errors which are sensed as soon as they are made has always been a problem for users of card punch machines. The operator knows the error exists but a nonerasable hole has been punched. In a data recorder of the type described, the problem can be corrected quickly and easily since the operator needs only to backspace and key in the correct data. This is possible because keyboard entries always go first to a correctible electronic memory and then to the record tape.

Very briefly, the data recorder in which the invention is utilized includes a keyboard which permits entry of 63 different character codes including alphabet, numerics and special characters. The output media is in the form of a seven channel magnetic tape, and up to 80 data characters can be recorded in each unit record. A magnetic core memory is used to store data to be recorded in a unit record during a recording run, and also to store program patterns. In the entry mode, keyed data is entered into memory until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator. In a machine of this type, or in any key-controlled machine, the interface between the operator controlled mechanical key action and the system control circuits must be highly reliable and must be such as to facilitate operation as much as possible.

It is therefore an object of the invention to provide an improved keyboard sprocket circuit for transmitting to the system circuits a reliable start signal in response to the actuation of a mechanical control key.

Another object is to provide an improved keyboard sprocket circuit for generating a start signal which is free of any spurious spikes or bounce pulses which may be produced in operation of the control key.

A further object is to provide an improved keyboard sprocket circuit for enabling an operator to repetitively recycle the machine without repetitively reactuating the control key.

In accordance with the invention, the output from the mechanical control switch or key is fed to a pulse shaping circuit which converts the signal to a level compatible with the system circuits and through the use of a pair of integrating networks reshapes the leading and trailing edges of the switch output to eliminate the unavoidable bounce spikes produced by the switch action. In accordance with a further feature of the invention, the pulse shaping circuit is provided with a feedback-delay loop including a timing circuit to throw the circuit network into oscillation at a fixed frequency after the control key has been held actuated for a predetermined time. This permits automatic repetitive recycling of the machine as long as the key is held actuated.

These and other objects, features and advantages will be made apparent by the following detailed description of a preferred embodiment of the invention, the description being supplemented by drawings as follows.

Figure 1:
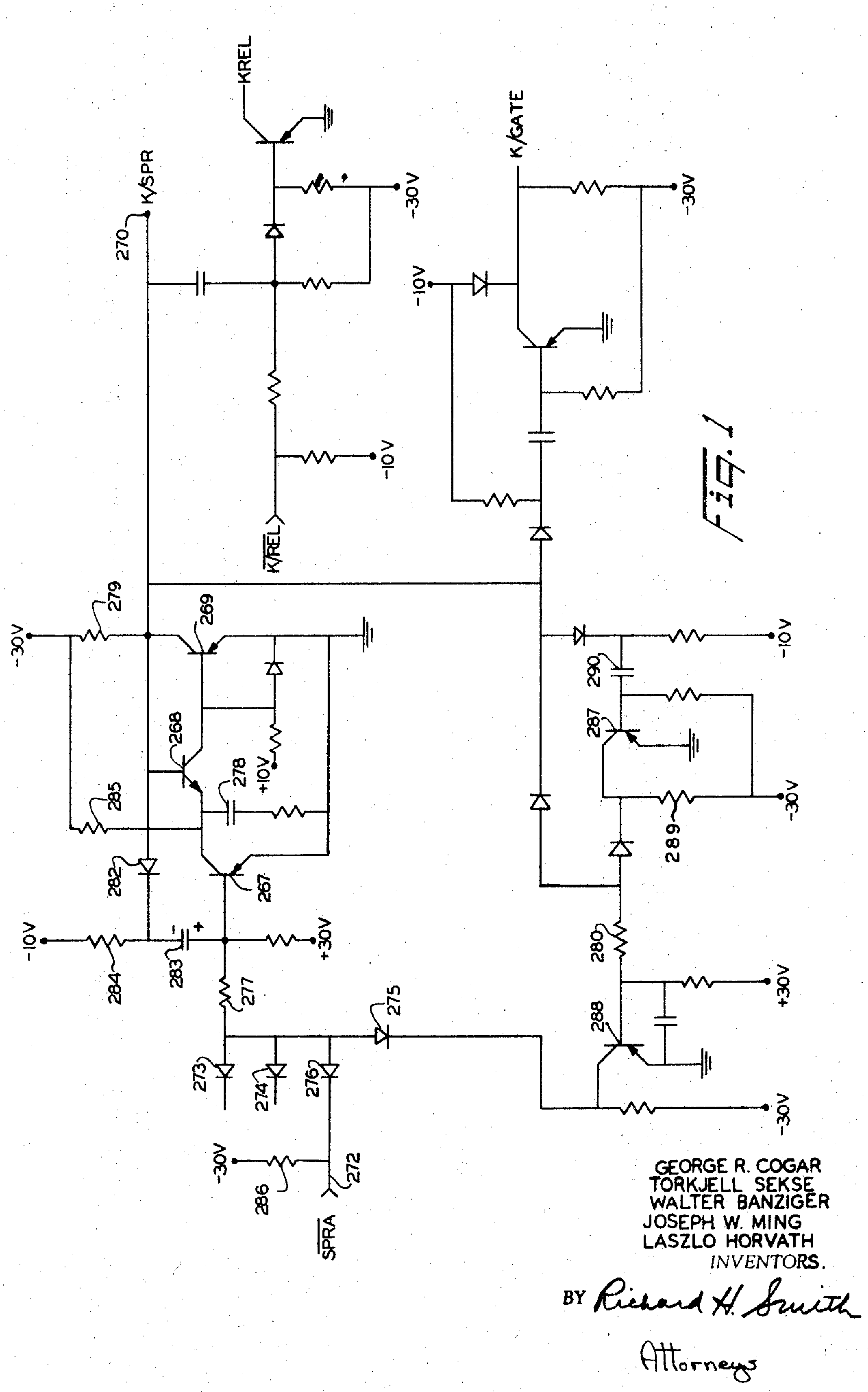
FIG. 1 is a schematic circuit diagram of a keyboard sprocket circuit constructed in accordance with the invention.

In FIG. 1, the function of transistors 267, 268 and 269 and their associated components is to provide a spike free signal at output terminal 270 in response to input terminal 272 being switched from a low to a high state by the actuation of the keyboard switch. The necessity for the circuit stems from the properties of a mechanical switch which causes an intermittent connection during the immediate periods of closure and break of the switch contacts. This characteristic is commonly referred to as switch bounce. To provide for proper synchronization of the logic circuits which must respond to the switch operation when a key is depressed, it is mandatory that a logic signal be derived which is free of any spikes.

In the quiescent state, the inputs to the cathodes of diodes 273, 274 and 275 are at a nominal ground potential. The input to the cathode of diode 276 is at a nominal potential of −10 volts, thus supplying current via resistor 277 to the base of transistor 267 causing it to be in a conductive state with its collector potential at essentially ground potential. With the collector of transistor 267 at ground potential, capacitor 278 is discharged and transistors 268 and 269 are in a nonconductive state. The collector of transistor 269 is at a nominal potential of −12 volts, said potential being established by the divider action of resistors 279 and 280. With the collector potential of transistor 269 at the nominal −12 volt level, transistor 268 is heavily back biased as is diode 282. With diode 282 back biased, capacitor 283 is charged to a nominal 10volts via resistor 284 in the base-emitter junction of transistor 267.

Upon actuation of a keyboard switch, the input to diode 276 switches from its quiescent potential of −10 volts to a nominal ground potential. During the first few milliseconds of the switch actuation, the input to the diode will be in an ambiguous state. That is to say that switch bounce may occur during the first few milliseconds of closure causing the input to diode 276 to switch intermittently between −10 volts and ground before eventually assuming a rest potential of ground. During the time that the input of diode 276 is at ground potential, transistor 267 will turn off and capacitor 278 will charge toward −10 volts via resistor 285.

During the bounce period, any time that the input to diode 276 reverts to the −10 volt potential, transistor 267 will again assume a conducting state and discharge capacitor 278. Thus, at the end of each bounce interval, the potential at the collector of transistor 267 is returned to ground potential. When the switch bounce ceases, the input to diode 276 remains at ground potential long enough for capacitor 278 to charge to the same potential as the collector of transistor 269, and transistor 268 will become forward biased supplying base current to transistor 269 the collector potential of which will rise towards ground increasing the base-emitter drive of transistor 268. This establishes a condition of heavy feedback between transistors 268 and 269 with the result that the collector of the latter switches rapidly from its rest potential of a nominal −12 volts to ground.

When the collector of transistor 269 switches to ground, diode 282 becomes forward biased and its cathode is switched to essentially ground potential. With the cathode of diode 282 at ground potential, capacitor 283 is now effectively connected across the emitter-base junction of transistor 267. The input to this transistor will now be integrated by the RC time constant of resistor 277 and capacitor 283. Thus, during the opening of the switch contacts, the intermittency of the signal at the input of diode 276 will not affect transistor 267 until the signal has gone back to the negative potential of −10 volts for a sufficient period of time to charge capacitor 283 to the point where transistor 267 again becomes forward biased. When this occurs and transistor 267 becomes conductive, the emitter current for transistor 268 and the corresponding base current for transistor 269 are diverted through the collector of transistor 267, and transistors 268 and 269 revert to their nonconducting state.

The circuit of FIG. 1 thus has a bidirectional hysteresis property. That is to say, prior to closure of a switch contact with transistors 268 and 269 off, transitions on the input line from −10 volts to ground are effectively integrated and the integrator is rapidly restored for any transition from ground to −10 volts. However, once the circuit has switched to its active state, input transitions from ground to −10 volts are integrated. Further, the speed of transition at the collector of transistor 269 is essentially independent of the integrator periods due to high feedback conditions during the transition intervals. The turn on integrator, comprised of resistor 285 and capacitor 278, has a longer period than the turn off integrator, comprised essentially of resistors 286 and 277 and capacitor 283, in that the bounce interval of a contact closure is considerably longer than the bounce interval of a contact break.

Figure 2:
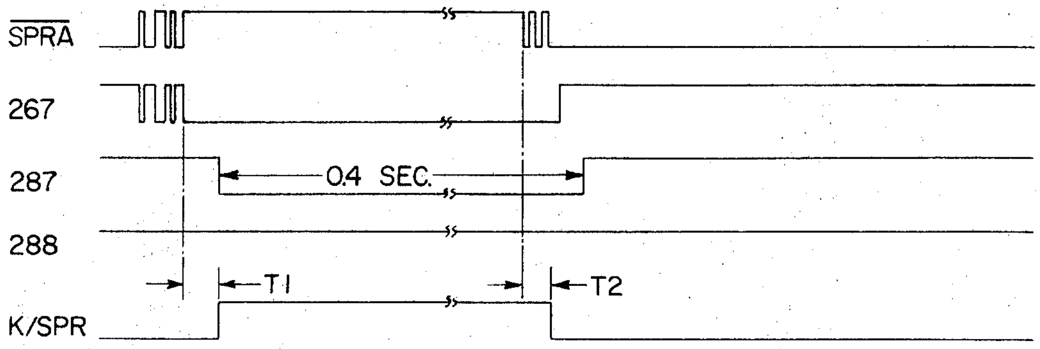
FIG. 2 is a waveform diagram depicting the operation of the circuit when the control key is held actuated for less than 0.4 seconds.

The above-described operation is illustrated by the waveform diagram of FIG. 2. The waveforms 267, 287 and 288 depict the voltage levels appearing at the collector terminals of transistors 267, 287 and 288, respectively. The time periods T1 and T2 are the delays produced by the integrating networks 278—285 and 283—277, respectively.

The automatic repeat function is provided for by transistors 287 and 288 and associated components. In their normal state transistors 287 and 288 are both conducting. When the collector of transistor 269 switches to its active state of ground potential, the base of transistor 287 is driven to a nominal potential of +10 volts. Thus, it becomes nonconductive and its collector resistor 289 then supplies drive current to the base of transistor 288 via resistor 280. If the collector of transistor 269 remains high for a period exceeding approximately .4 of a second, capacitor 290 will discharge to the point where transistor 287 again becomes conductive diverting the current from resistor 289, thus removing the base current to transistor 288 whereby the latter becomes nonconductive. With transistor 288 nonconducting, the input to diode 275 switches to a nominal potential of −10 volts thus providing the equivalent of a contact opening.

With the common point of diodes 273, 274, 275 and 276 at a nominal potential of −10 volts, capacitor 283 charges until transistor 267 becomes conductive causing transistors 268 and 269 to become nonconductive. In addition, the collector potential of transistor 269 reverts to its quiescent potential of −12 volts and transistor 288 again becomes conductive. Thus, an oscillatory action is established. During the first interval, capacitor 290 would have been fully charged to a potential of −10 volts, thus giving the aforementioned .4 second "off" interval for transistor 287. During the ensuing off interval of transistor 269, capacitor 290 cannot fully recover before transistor 269 again switches to its active state. Thus, the subsequent off intervals of transistor 287 will be but a fraction of the initial interval. The result is that if a switch is held depressed for a period exceeding .4 second, the output at 270 automatically switches to the inactive state causing the acceptance of the key action, and then K/SPR again goes active and the cycle repeats until the switch is released.

Figure 3:
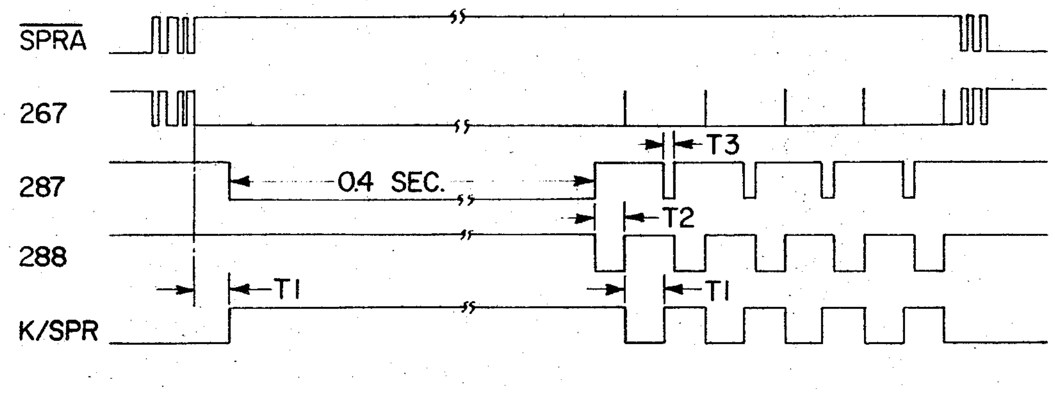
FIG. 3 is a waveform diagram showing the operation of the circuit when the control key is held actuated for more than 0.4 seconds.

The repeat operation is illustrated by the waveform diagram of FIG. 3. As in FIG. 2 the waveforms 267, 287 and 288 appear at the collectors of transistors 267, 287 and 288 and the time periods T1 and T2 are the delays produced by the integrating networks 278—285 and 283—277, respectively. T3 is the delay produced by the integrator including capacitor 290.

While the circuits and logic diagrams disclosed in the drawings show transistors as being of a specific PNP or NPN type, and also refer to various inputs and signals as switching from a low to a high state or vice versa, it will be understood that the polarity can be reversed in any circuit without making a material change in the arrangement or operation of the circuit.

It will be appreciated that various additional changes in the form and details of the above-described preferred embodiment may be effected by persons of ordinary skill without departing from the true spirit and scope of the invention.

We claim:

1. In a data recording machine of the character described including a keyboard, a keyboard sprocket and automatic repeat circuit comprising: an input and an output terminal, the potential at said input terminal being switchable from a low to a high state by the actuation of a keyboard switch, a plurality of diodes the anodes of which are connected to a common point, said input terminal being connected to the cathode of one of said diodes, the input to the cathodes of the other diodes all being at a high potential, a first transistor, a resistor connected between the common point of said diodes and the base of said first transistor, said input terminal supplying current to said transistor through said resistor whereby the transistor is made conductive when the circuit is in its quiescent state, a second and a third transistor each of which is nonconductive when the circuit is in its quiescent state, said second transistor having its emitter connected to the collector of said first transistor and its collector connected to the base of said third transistor, the base of said second transistor being connected to the collector of said third transistor, the collector of the third transistor also being connected to said output terminal, the emitters of said first and third transistors both being connected to a point of reference potential, a first capacitor connected between the collector of said first transistor and said point of reference potential, said capacitor being discharged when the circuit is in its quiescent state, said input terminal being switched to a high state upon closing a keyboard switch causing said first transistor to become nonconductive and said capacitor to start charging, said second transistor being rendered conductive when said capacitor charges to the same potential as that of the collector of said third transistor whereby the second transistor supplies current to the third transistor making it conductive also, the reciprocal base-collector connection between said second and third transistors causing heavy feedback between them whereby the collector of the third transistor switches from a low to a high state and said output terminal is supplied with a spike free signal for generating a keyboard sprocket; a fourth transistor having its base connected to the collector of said third transistor, a second capacitor in said last-named base to collector connection, a fifth transistor having its base connected to the collector of said fourth transistor and its collector connected to the cathode of one of said diodes that is not connected to said input terminal, the emitters of said fourth and fifth transistor both being connected to the point of reference potential, said fourth and fifth transistors each being conductive when the circuit is in its quiescent state, said fourth transistor being rendered nonconductive when the collector of said third transistor switches to its high state, means to supply drive current to said fifth transistor to keep it conductive when the fourth transistor becomes nonconductive, said second capacitor being caused to discharge when said third transistor collector remains in its high state beyond a predetermined period of time whereby said fourth transistor again becomes conductive and prevents the supply of further drive current to said fifth transistor, said fifth transistor being made nonconductive by the removal of its drive current whereby the input to the diode connected to its collector is switched from a high to a low state thereby providing the equivalent of a switch contact opening, and a third capacitor connected between the bases of said first and second transistors, the switching of the input to said last-named diode causing said third capacitor to be charged until said first transistor again becomes conductive whereby said second and third transistors become nonconductive and the collector of the latter switches to its low state causing an interruption in the signal supplied to said output terminal, said fifth transistor being again made conductive by the nonconductive state of said second and third transistors whereby an oscillatory action is established.

2. A circuit as defined in claim 1 wherein said resistor and said third capacitor essentially comprise a turn off integrator for the circuit.

3. A circuit as defined in claim 1 including a second resistor extending from a point of biasing potential to the collector of said first transistor, said second resistor and first capacitor forming a turn on integrator for the circuit, said turn on integrator having a longer period than said turn off integrator.

4. In a circuit for controlling the operation of a system in response to actuation of a start switch wherein a pulse shaping circuit receives the output from said switch and generates a start signal substantially representative of the duration of actuation of said switch, the combination comprising:

a timing circuit responsive to said start signal for generating a control signal a first predetermined period of time after initiation of said start signal; and a simulation circuit operable in response to said control signal for transmitting to the input of said pulse shaping circuit a series of signals simulating repeated actuations of said start switch, whereby said pulse shaping circuit generates a corresponding series of start signals to control said system accordingly.

5. The circuit set forth in claim 4 wherein said timing circuit and said simulation circuit are connected in a feedback delay loop between the input and output of said pulse shaping circuit whereby said circuit is caused to oscillate at a fixed frequency after said first predetermined period of time.

6. The circuit set forth in claim 5 wherein said timing circuit includes an integrating network to provide said feedback delay, said network being constructed and arranged to recover to a fully charged state between actuations of said start switch and to only partially recover between said fixed frequency oscillations whereby the period of said oscillations is substantially shorter than said first predetermined period of time.

7. In a data recording machine of the character described, a keyboard sprocket circuit comprising:

a. an input and an output terminal, a first transistor that is conductive and a pair of additional transistors that are nonconductive when the circuit is in its quiescent state, said pair of transistors having reciprocal base-collector connections with one another whereby heavy feedback occurs when one of the transistors becomes conductive, and a resistor-capacitor turn on integrator and a resistor-capacitor turn off integrator cooperable with said transistors, said first transistor being rendered nonconductive and said pair of transistors being rendered conductive when a signal is applied to said input terminal in response to the closing of the contacts of a keyboard switch, said pair of transistors being operable in a conductive state to supply a signal to said output terminal for the generation of a keyboard sprocket, said signal being supplied essentially independent of the integrator periods due to the heavy feedback action between said pair of transistors; and b. a second pair of transistors connected in said circuit across said previously named transistors, said second pair of transistors being conductive when the circuit is in its quiescent state, means to render one of said second pair of transistors nonconductive when said first pair of transistors is applying a signal to said output terminal, means operable when said one transistor is rendered nonconductive to keep the other transistor conductive, means operable when a signal is supplied to said output terminal beyond a predetermined period of time to render the nonconducting transistor of said second pair conductive and the conducting transistor nonconductive, and means operably connecting said last-named transistor to said first three named transistors whereby said first transistor is again rendered conductive and said first pair of transistors nonconductive whereby the signal to said output terminal is interrupted, the nonconductive transistor of said second pair being made conductive by the nonconductive state of said first pair of transistors whereby an oscillatory action is established.

PO-1050
(5/69)

UNITED STATES PATENT OFFICE
CERTIFICATE OF CORRECTION

Patent No. 3,555,306 Dated January 12, 1971

Inventor(s) George R. Cogar et al

It is certified that error appears in the above-identified patent and that said Letters Patent are hereby corrected as shown below:

In the Heading:

The filing date of U. S. Patent No. 3,483,523 originally given as "March 30, 1966" should read "March 3, 1966"

Signed and sealed this 8th day of May 1973.

(SEAL)
Attest:

EDWARD M.FLETCHER,JR.
Attesting Officer

ROBERT GOTTSCHALK
Commissioner of Patents